United States Patent Office 3,109,036
Patented Oct. 29, 1963

3,109,036
ISOMERIZATION OF DIMETHYLNAPHTHALENES
George Suld, Springfield, and Archibald P. Stuart, Media, Pa., assignors to Sun Oil Company, Philadelphia, Pa., a corporation of New Jersey
No Drawing. Filed Oct. 12, 1961, Ser. No. 144,557
9 Claims. (Cl. 260—668)

This invention relates to a method for isomerizing dimethylnaphthalenes, other than 1,2-dimethylnaphthalene, to produce a dimethylnaphthalene product including at least one isomer of the original dimethylnaphthalene.

There are ten possible isomers of dimethylnaphthalene and most if not all of these occur in coal tar and in gas oil fractions of appropriate boiling range. Various individual isomers also have been produced from other materials by chemical procedures. The preparation of various individual dimethylnaphthalenes by chemical procedures has been described by Bailey et al. in J. Inst. Petroleum, vol. 33, page 503 (1947), and by Barnett et al. in J. Chem. Soc. (London), 1933, pages 434–437.

The individual dimethylnaphthalene isomers have utility as intermediates in the preparation of numerous chemical products. For example, the 2,6-isomer can be converted by oxidation into naphthalene-2,6-dicarboxylic acid which can be used for making high quality resins. For convenience the dimethylnaphthalenes are hereinafter sometimes referred to as "DMN."

The present invention provides a method of converting dimethylnaphthalenes, other than the 1,2-isomer, into other isomers by an isomerization procedure utilizing $HF-BF_3$ as catalyst. We have now found that this catalyst is capable of effecting certain shifts of methyl groups on the naphthalene nucleus and further that the shift is limited to the movement of methyl groups only between adjacent alpha and beta positions. Thus a shift cannot occur from one ring to the other or between the 2-position and the 3-position. This is advantageous since it limits the number of isomeric products that will be produced from a particular isomer to no more than two and hence simplifies the problem of separating the desired isomer from the reaction product. The above-mentioned limitation on what can occur in the isomerization reaction results in three separate equilibria among the dimethylnaphthalenes which can be illustrated by the following equations:

(1) 2,6-DMN⇌1,6-DMN⇌1,5-DMN
(2) 2,3-DMN⇌1,3-DMN⇌1,4-DMN
(3) 2,7-DMN⇌1,7-DMN←1,8-DMN

Equation 1 indicates that each of the 2,6-, 1,6- and 1,5-isomers will isomerize to the other two but that no other isomers will be formed. Equation 2 indicates the same with respect to the 2,3-, 1,3- and 1,4-isomers. Equation 3 differs in that 1,8-DMN cannot be formed from either of the 2,7- and 1,7-isomers, although 1,8-DMN will isomerize entirely to the other two. This is indicated by the arrow adjacent 1,8-DMN pointing only to the left. It is to be noted that the 1,2-isomer is not involved in any of the equilibria and will not isomerize under the conditions of the present process.

The equilibrium amounts of the components for each of the foregoing equations depends only to a small extent upon the reaction temperature employed and mainly upon the proportion of $BF_3$ used in the reaction mixture. Equilibrium amounts for particular sets of reaction conditions are hereinafter more fully specified to illustrate what can be accomplished by the present process.

According to the invention a dimethylnaphthalene, other than 1,2-DMN, is dissolved in a solvent that is inert to HF and $BF_3$ and the mixture is contacted at a temperature in the range of 0–100° C. with HF and $BF_3$ for a time sufficient to effect substantial isomerization and preferably to at least approach equilibrium. The time required to reach equilibrium will depend upon the temperature selected within the specified range, with the reaction rate being slow at low temperature and increasing as the temperature is raised. It also depends to a large extent on the particular starting isomer being treated. The amount of HF used should be at least 3 moles per mole of DMN charged and more preferably at least 10 moles per mole. The molar ratio of $BF_3$ to DMN charged should be at least 0.01 and higher proportions including an equimolar amount or a molar excess of $BF_3$ can be used if desired, for example, up to 5 moles per mole of DMN can be used.

The use of a solvent for dissolving the DMN charge is highly important for obtaining a clean isomerization reaction, as otherwise tars tend to be formed. The solvent must be one which is inert to HF and $BF_3$ under the reaction conditions employed. Examples of suitable solvents are benzene, toluene, hexane, heptane, octane, cyclohexane and methylcyclohexane. No olefin should be present in the solvent, and it is preferred that the solvent not be one which contains a tertiary hydrogen atom. The amount of solvent employed generally should be such that the DMN concentration in the solution is in the range of 1% to 50% by volume and more preferably 5% to 20%.

After the isomerization reaction has been effected, the solvent, HF and $BF_3$ can be recovered by distillation from the product for re-use. Preferably the distillation is carried out under reduced pressure such that the temperature does not exceed 100° C. The desired isomer can be separated from the reaction product in any suitable manner and the other components can, if desired, be recycled to the isomerization step for further conversion to the desired isomer. Selective crystallization is a particularly useful separation technique. For example, with the equilibrated product obtained according to Equation 1 the 2,6-isomer can readily be crystallized from the others. The same is true of the 2,3- and 2,7-isomers obtained according to Equations 2 and 3, respectively.

As previously stated, the composition of the equilibrated product depends to a large extent upon the amount of $BF_3$ used in the reaction mixture. The following data show the approximate equilibrium compositions that are obtained for the reaction of Equation 1 when only 10 mole percent of $BF_3$, based on the DMN charged, is used and when an excess molar amount of $BF_3$ is used, e.g. 110%:

|  | Weight percent of Isomer | |
|---|---|---|
|  | 10% $BF_3$ | 110% $BF_3$ |
| 2,6-DMN | 51.4 | 32.2 |
| 1,6-DMN | 43.7 | 65.0 |
| 1,5-DMN | 4.9 | 2.8 |

The composition values given apply approximately regardless of which of the three isomers is the starting material. From these data it can be seen that a useful application of the invention is in preparing the 2,6-isomer from either 1,6-DMN or 1,5-DMN or mixtures thereof. Another application is in the preparation of the 1,6-isomer from 2,6-DMN. By starting with the latter, isomerizing it using 110% $BF_3$ and then crystallizing the unconverted 2,6-DMN from the reaction product, a filtrate constituting 1,6-DMN in a purity of the order of 90% or higher can be obtained. The preparation of the 1,5-isomer by isomerizing either of the other two does not appear attractive since its equilibrium concentration is too low.

With respect to the reaction of Equation 2, the equilibrium concentrations in the product for the two different proportions of $BF_3$ are approximately as follows:

|  | Weight percent of Isomer | |
|---|---|---|
|  | 10% $BF_3$ | 110% $BF_3$ |
| 2,3-DMN | 22.3 | 0.5 |
| 1,3-DMN | 74.9 | 99.0 |
| 1,4-DMN | 2.8 | 0.5 |

From these values it is apparent that when using a relatively small amount of $BF_3$, e.g., a $BF_3$ to DMN molar ratio in the range of 0.01:1 to 0.5:1, either 2,3-DMN or 1,3-DMN can be prepared from the other isomers but that the preparation of 1,4-DMN is not attractive. A particularly attractive reaction is the preparation of 1,3-DMN from either 2,3-DMN or 1,4-DMN using a molar excess of $BF_3$, since the 1,3-isomer is obtained in a surprisingly high purity.

Regarding the reaction of Equation 3, the equilibrium composition of the products obtained with the different $BF_3$ proportions are approximately as follows:

|  | Weight percent of Isomer | |
|---|---|---|
|  | 10% $BF_3$ | 110% $BF_3$ |
| 2,7-DMN | 68.5 | 80 |
| 1,7-DMN | 31.5 | 20 |
| 1,8-DMN | 0 | 0 |

These data show that either the 2,7- or the 1,7-isomer can be prepared from the other or from 1,8-DMN but that it is impossible to obtain the latter isomer by the present process. An attractive application of the process is the preparation of 2,7-DMN from either or both the 1,7- or 1,8-isomers, since the 2,7-isomer is formed in good yield and can readily be separated from the reaction mixture by selective crystallization. The 1,7-DMN obtained as filtrate from the crystallization step can, if desired, be recycled for further conversion.

As specific illustrations of the invention, a series of runs was made in which various DMN isomers dissolved in a concentration of 10% by weight in benzene were contacted for 3 hours at 70° C. with HF–$BF_3$. The $BF_3$ was used in molar amount of 10% based on the DMN and the molar proportion of HF to DMN was of the order of 50:1. The reaction proceeded cleanly with essentially no formation of tar. Compositions of the products, as determined by vapor phase chromatography, are shown in Table I and are given as weight percent.

The products which were not DMN's were not specifically determined but evidently were formed by a small amount of side reaction such as disproportionation. The 4.5% of 1,4-DMN shown in the product from 1,8-DMN apparently was due to the impure nature of the charge and not because of the isomerization reaction.

Another series of runs was made in similar manner as described above except that the molar proportion of $BF_3$ was in the range of 100–150% based on the DMN. Results are shown in Table II.

Table II

|  | 1,3- | 1,4- | 1,5- | 1,6- | 1,7- | 1,8- | 2,3- | 2,6- | 2,7- | Other Product |
|---|---|---|---|---|---|---|---|---|---|---|
| 2,6-DMN |  |  | 3.2 | 56.2 |  |  |  | 32.4 |  | 8.2 |
| 1,6-DMN |  |  | 2.3 | 55.4 |  |  |  | 32.8 |  | 9.9 |
| 2,7-DMN |  |  |  |  | 20.6 |  |  |  | 79.4 |  |
| 2,3-DMN | 96.0 | 0.5 |  |  |  |  |  | 0.6 |  | 2.9 |

From the data given in Tables I and II it can be calculated that the proportions of the various isomers to each other in the products are approximately in accord with the values previously described for the three equilibria represented by Equations 1, 2 and 3.

I claim:

1. Method of isomerizing a dimethylnaphthalene to form at least one other dimethylnaphthalene which comprises contacting a dimethylnaphthalene, other than the 1,2-isomer, dissolved in a solvent that is inert to HF and $BF_3$ with HF in amount of at least 3 moles per mole of dimethylnaphthalene and with $BF_3$ in amount of at least 0.01 mole per mole of dimethylnaphthalene at a temperature in the range of 0 to 100° C., whereby methyl groups shift only between adjacent alpha and beta positions on the naphthalene nucleus, and separating HF and $BF_3$ from a dimethylnaphthalene product including an isomer of the original dimethylnaphthalene.

2. Method according to claim 1 wherein the dimethylnaphthalene charge is selected from the group consisting of 1,5-dimethylnaphthalene, 1,6-dimethylnaphthalene and mixtures thereof and the product contains the 2,6-isomer.

3. Method according to claim 1 wherein the dimethylnaphthalene charge is 2,6-dimethylnaphthalene and the product contains the 1,6-isomer.

4. Method according to claim 1 wherein the dimethylnaphthalene charge is selected from the group consisting of 1,7-dimethylnaphthalene, 1,8-dimethylnaphthalene and mixtures thereof and the product contains 2,7-dimethylnaphthalene.

5. Method according to claim 1 wherein the dimethylnaphthalene charge is 2,7-dimethylnaphthalene and the product contains 1,7-dimethylnaphthalene.

6. Method according to claim 1 wherein the dimethylnaphthalene charge is selected from the group consisting of 1,3 - dimethylnaphthalene, 1,4 - dimethylnaphthalene and mixtures thereof, the molar ratio of $BF_3$ to dimethylnaphthalene charge is in the range of 0.01:1 to 0.5:1 and the product contains 2,3-dimethylnaphthalene.

7. Method according to claim 1 wherein the dimethylnaphthalene charge is selected from the group consist- Table I

|  | 1,3- | 1,4- | 1,5- | 1,6- | 1,7- | 1,8- | 2,3- | 2,6- | 2,7- | Other Product |
|---|---|---|---|---|---|---|---|---|---|---|
| 2,6-DMN |  |  | 4.8 | 41.9 |  |  |  | 51.2 |  | 2.1 |
| 1,6-DMN |  |  | 5.8 | 45.4 |  |  |  | 48.0 |  | 0.9 |
| 1,5-DMN |  |  | 3.8 | 40.9 |  |  |  | 50.9 |  | 4.4 |
| 2,7-DMN |  |  |  |  | 29.9 |  |  |  | 65.0 | 5.1 |
| 2,3-DMN | 70.2 | 3.1 |  |  |  |  | 25.0 |  |  | 1.6 |
| 1,4-DMN | 77.3 | 2.5 |  |  |  |  | 19.0 |  |  | 1.0 |
| 1,8-DMN [1] |  | 4.5 |  |  | 24.0 |  |  |  | 61.5 | 10.0 |

[1] 90% purity.

ing of 1,4-dimethylnaphthalene, 2,3-dimethylnaphthalene and mixtures thereof and the product contains 1,3-dimethylnaphthalene.

8. Method of preparing 1,3-dimethylnaphthalene which comprises contacting 2,3-dimethylnaphthalene with HF in amount of at least 3 moles per mole of dimethylnaphthalene and with $BF_3$ in amount of at least one mole per mole of dimethylnaphthalene and separating HF and $BF_3$ from a product which is 1,3-dimethylnaphthalene of high purity.

9. Method according to claim 1 wherein the temperature is in the range of 25–75° C.

References Cited in the file of this patent

UNITED STATES PATENTS 2,425,559     Passino et al. _____ Aug. 12, 1947